March 26, 1963  
W. F. MEYERS  
3,083,252  
CURRENT-PRODUCING CELL AND METHOD OF  
GENERATING CURRENT WITH SAME  
Filed Jan. 12, 1960
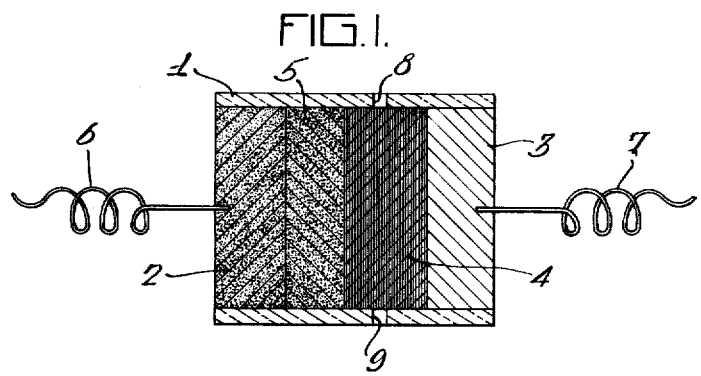
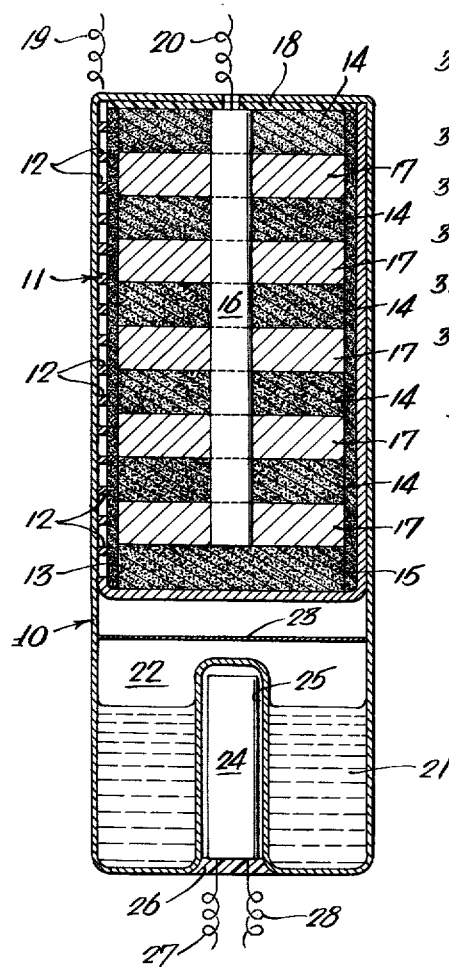
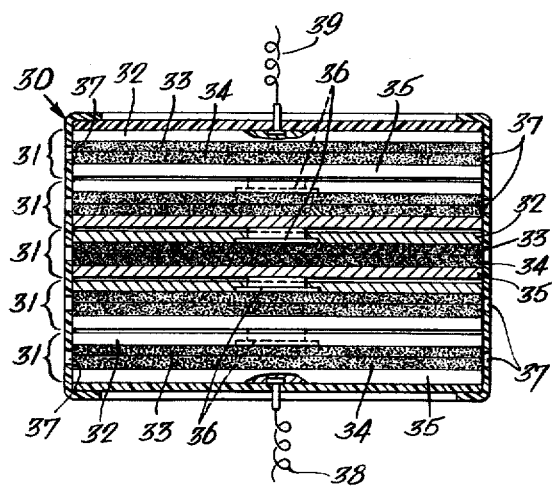
INVENTOR:  
WILLIAM F. MEYERS  
BY Howson & Howson  
ATTYS.

United States Patent Office 3,083,252
Patented Mar. 26, 1963

3,083,252
CURRENT-PRODUCING CELL AND METHOD OF GENERATING CURRENT WITH SAME
William F. Meyers, Blue Bell, Pa., assignor to G. & W. H. Corson, Incorporated, Plymouth Meeting, Pa., a corporation of Pennsylvania
Filed Jan. 12, 1960, Ser. No. 2,010
16 Claims. (Cl. 136—90)

The present invention relates to a novel electric current-producing cell, and to a novel method of generating electric current using the same; and, more particularly, the invention relates to an improved electric current-producing cell system embodying an electrolyte in which the principal solvent is liquid ammonia instead of water as is the case in conventional electric current-producing cells. The invention also relates to a battery comprising two or more of such simple cells.

The electric current-producing cells and batteries in general use for years down to the present day utilize an aqueous solution of some acid, base or salt as an electrolyte. These cells and batteries perform under standard conditions of atmospheric pressure and temperature, and most of them can be stored for reasonable periods of time without deterioration. The effect of increasing the temperature in storage tends, in general, to reduce the shelf life of these cells and batteries. Reduction in temperature below freezing causes them to become inoperative. The chief reason for this inoperative characteristic of conventional cells and batteries at low temperatures is the electrolyte employed. While the introduction of certain solutes can be used to lower the freezing point of the aqueous electrolyte, it is still impossible to obtain good cell characteristics in these cells at temperatures very much below the freezing point of water. In the case where temperatures greatly below the freezing point of water are encountered, the conventional aqueous type cell will not operate. The conventional aqueous cell systems, therefore, possess limitations which render them unsatisfactory for operation at low temperatures as encountered for example, in arctic regions or at high altitudes.

Because of the limitations of aqueous cell systems there have been attempts to prepare cell systems in which the principal solvent for the electrolyte has been one or another organic liquid, such as pyridine, methane amide, methyl acetate, methanol, and the like. However, any advantage gained through the use of such liquids has been small relative to the limitations and the disadvantages encountered, and these systems have never achieved any commercial success.

In U.S. Patent No. 2,863,933, and in copending application Serial No. 546,364, filed November 14, 1955, are disclosed and claimed cell systems in which the electrolyte solvent is liquid ammonia. In the cell system of Patent 2,863,933, the anode comprises an electropositive metal, the anolyte comprises a salt dissolved in the liquid ammonia, the cation of which corresponds to the electropositive metal of the anode, and the catholyte comprises an ammonium and/or metal salt dissolved in the liquid ammonia the metal cation of which develops an electrolytic potential in liquid ammonia at least 0.75 volt less than that developed by the metal of the anode in liquid ammonia.

The cell system of application Serial No. 546,364 comprises an anode, a depolarizing cathode and an electrolyte comprising liquid ammonia having material dissolved and ionized therein to render it electrically conductive, at least the anolyte portion of which comprises ammonium ions.

In copending application Serial No. 658,311, filed May 10, 1957, are disclosed and claimed a vapor-activatable cell comprising a cell compartment and, within the cell compartment, an anode, a cathode and a component of the electrolyte by itself substantially inactive to generate current with said anode and cathode, and means for introducing remaining component of electrolyte in the vapor state to the compartment for contact with the first-mentioned component to form active electrolyte. In the preferred embodiment the component of the electrolyte introduced in the vapor state is ammonia which is the solvent in the resulting electrolyte system.

It is the principal object of the present invention to provide a novel electric current-producing cell of the ammonia system in which the electrolyte solvent is liquid ammonia.

A further object of the invention is to provide an improved electric current-producing cell system of the ammonia type as disclosed and claimed in the foregoing patent and copending applications, the disclosures of which are incorporated herein by reference.

Still another object of the invention is to provide an improved electric current-producing cell of the ammonia system which possesses greater activity and/or capacity than heretofore.

Still another object of the invention is to provide a novel method of generating electric current by chemical means with the ammonia system.

Other objects, including the provision of a novel electric current-producing battery possessing the herein-mentioned features, will become apparent from a consideration of the following specification and claims.

Before discussing the present cell in detail, it will be helpful to consider the nature of liquid ammonia and of the liquid ammonia system. Under ordinary atmospheric conditions ammonia is a colorless gas. Upon cooling, however, under one atmosphere pressure, this gas can be converted to a liquid at about $-33°$ C. Liquid ammonia freezes at about $-77°$ C. Theoretically, liquid ammonia ionizes mainly into the ammonium ($NH_4+$) ion and amide ($NH_2-$), imide ($NH=$) and nitride ($N\equiv$) ions, the ammonium ions corresponding to the hydrogen ions of the aqueous system and the amide, imide and nitride ions corresponding to the hydroxyl ions of the aqueous system. However, as a practical matter, liquid ammonia does not ionize measurably. Under present day chemical terminology, the names of classes of inorganic compounds are based on the aqueous system. In other words, ammonium hydroxide is normally considered to be a base while ammonium compounds produced, for example, by the neutralization of ammonium hydroxide with an acid, are normally considered to be salts. It will be seen that in the liquid ammonia system, conventional terminology may be misleading in that, in the liquid ammonia system, ammonium compounds provide ammonium ions and hence ammonium hydroxide is actually a weak acid with respect to liquid ammonia, and ammonium salts, such as ammonium thiocyanate, are actually strong acids. Water, since it forms ammonium ions in the liquid ammonia system, functions as a weak acid. The addition of water to liquid ammonia is similar to adding ammonium hydroxide. By the same token the addition of an acid (HA) results in the formation of ammonium ions and hence produces acidity ($NH_4A$) in the liquid ammonia system. The bases in the liquid ammonia system, the amides, imides and nitrides, are in general insufficiently soluble for practical electrolyte compositions. There are many analogies between the function of ordinary metal salts in liquid ammonia and their function in water. It will be seen, however, that in electrolytes wherein liquid ammonia is the principal solvent, "acidity" of "neutrality" may be controlled by the addition of ammonia compounds, water or acid, on the one hand, or of amides, etc. on the other. Herein, reference is made to ammonium compounds, that is hydroxide or salts, in accordance with conventional terminology in spite of the fact that, in the liquid ammonia system, they are the acids.

Liquid ammonia by itself is not sufficiently conductive to serve as an electrolyte in an electric current-producing cell. As in the case of water in the aqueous cell systems, material freely ionizable in the solvent, ammonia, must be dissolved in the liquid ammonia in order to render it sufficiently conductive.

As in aqueous cell systems, polarization of the cathode presents problems in ammonia cell systems. By "polarization" is meant the formation, at the cathode, of hydrogen or other reaction products which tend to raise the cathode potential and/or produce loss of contact between the cathode conductor and the electrolyte. The prevention of this phenomenon is termed "depolarization." Depolarization can be accomplished by physical means, based on the ability of hydrogen to diffuse through solid materials, or by chemical means through the use of a material, in contact with the cathode conductor, which reacts with polarizing products thereby preventing or minimizing their formation. Examples of materials most often used heretofore for this purpose in ammonia cell systems are manganese dioxide and lead dioxide. With manganese dioxide and other depolarizing materials heretofore used there are limitations due to effects thereon of acid or solutes in the electrolyte.

It has been found that a sulfate of a heavy metal below ferrous iron in the electrochemical series serves as an excellent depolarizer in the ammonia cell system and is devoid of the above-mentioned limitations. The sulfate may be employed as the sole depolarizer or may be used in conjunction with other depolarizing materials. It has also been found that the stated sulfate serves to regenerate the electrolyte solute so that the present cell is not electrolyte-limited. The improvement through the use of the stated sulfate in accordance with the present invention manifests itself largely through greater capacity for the cell. Furthermore, since, in the present cell the sulfate regenerates electrolyte solute, the cell is not electrolyte limited. This is most desirable since, in general, the capacity of cells is limited by the quantity of electrolyte which can be held by the cell.

The improvement of the present invention, therefore, comprises, in the ammonia electric current-producing cell system involving an anode, a cathode and electrolyte in which liquid ammonia is the solvent, a sulfate of a heavy metal below ferrous iron in the electrochemical series in contact with the cathode.

The cell as prepared and marketed may or may not contain the liquid ammonia already in association with the anode, cathode, electrolyte solute and sulfate. When the cell contains the ammonia it comprises the anode, cathode and electrolyte comprising electrolyte solute dissolved in liquid ammonia, and the stated sulfate in contact with the cathode, and requires but the completion of the circuit to generate current. In accordance with the preferred embodiment, however, the cell device is marketed without the ammonia, being activatable upon the admission of ammonia to the cell compartment, and in this case the cell device comprises a cell compartment, and within said compartment, an anode, a cathode, an electrolyte solute and the stated sulfate in contact with the cathode, and means for introducing ammonia to said cell compartment for contact with said anode, cathode, electrolyte solute and the stated sulfate.

For illustration of cells embodying the present invention reference may be had to the drawings in which:

FIGURE 1 represents, schematically, a side elevational, sectional view of one form of simple cell to which the present invention is applicable;

FIGURE 2 represents, schematically, a side elevational, sectional view of another form of cell to which the present invention is applicable, and FIGURE 3 illustrates schematically, a side elevational view, partly in section, a form of battery comprising a plurality of cells in a single compartment.

Referring to the electrolyte, during generation of current the stated sulfate serves to regenerate the solute for the electrolyte so that, although initially some solute soluble in the liquid ammonia and serving to render it conductive will be required, the output of the cell is not limited by the amount of solute present. However, there is a minimum amount required, as is true with other cell systems not "electrolyte-limited" and the nature of the solute in conjunction with the nature of the other components of the cell, particularly the anode, affects the characteristic of the cell. In general, the more "acid" the liquid ammonia electrolyte, the higher the conductivity. As stated, ammonium hydroxide and ammonium salts are "acids" in the liquid ammonia system. Hence, any ammonium salt soluble in liquid ammonia at least to the extent hereinafter discussed or any compound which forms with the ammonia either ammonium hydroxide or an ammonium salt in solution therein to a concentration hereinafter discussed, may be employed as the solute. Of the ammonium salts, ammonium thiocyanate and ammonium perchlorate are particularly advantageous. These salts are freely soluble in liquid ammonia. Other salts that may be mentioned as being applicable are the cyanides, chlorides, cyanates, fluoborates, iodides, nitrates, nitrites, and the like. A metal salt or salts may be employed, and when the cation is a metal, it will generally be an electropositive metal above ferrous iron in the electrochemical series, particularly lithium, sodium, potassium, caesium, rubidium, calcium, strontium, barium, magnesium, zinc, aluminum, beryllium, manganese, and the like. Normally, with respect to the anolyte solute, the metal salt will be at least as electropositive as the anode metal. Salts of the alkali and alkaline earth metals, especially salts of lithium, calcium and magnesium, and zinc salts are particularly preferred. Of all the salts, the ammonium salts and the lithium salts have been found to be particularly advantageous.

The acidity that can be tolerated in any particular cell system may be limited by the nature of the other components of the cell, particularly the anode. As will be pointed out more in detail hereinafter, in some situations care must be exercised in controlling the acidity of the electrolyte to avoid undue local action at the anode. Hence, the requisite conductivity of the electrolyte may be provided in part by metal salts, which, in the ammonia system, are more or less neutral.

Since, the anode may favor one set of conditions, e.g. low acidity, and the cathode may favor another set of conditions, e.g. high acidity, the solute employed may often be a compromise between these two extreme considerations. On the other hand, the cell compartment may actually be divided into two separate sections namely, an anode section and a cathode section, with differing solutes in each, the two sections being separated by a porous or permeable diaphragm. In such case, separate electrolyte portions will be formed, namely, an anolyte and a catholyte.

There are other factors which also determine the amount of solute dissolved in the liquid ammonia to provide the electrolyte. One of the primary considerations in this connection is the temperature under which the cell is designed to operate. In general, the conductivity of the electrolyte decreases with decreasing temperature. For any given solute at any particular temperature, there is an optimum concentration of solute to provide optimum conductivity. Below and above this optimum concentration, the conductivity falls off. In other words, by plotting conductivity versus concentration of solute at any given temperature, there results a curve which starts out at the low side of conductivity, ascends to one or more peaks and then drops off again. Thus, if the cell is to operate an an exceedingly low temperature, and it is desired to provide maximum conductivity at that temperature, the concentration of solute must be controlled. When the cell is to operate at higher temperatures, such as high atmospheric temperatures or above, it is often desirable to incorporate sufficient solute to raise the boiling point of the electrolyte to above the temperature conditions to which the cell is to be subjected to avoid the use of pressure. Again, when the cell is to operate at exceedingly low temperatures, it will be necessary that the electrolyte remain as a liquid at that operating temperature. For example, with certain molar proportions of ammonium thiocyanate, ammoniated ammonium thiocyanate freezes out. Thus, when operating at these temperatures, the amount of solute employed should be substantially less than that providing, with the ammonia, the ammoniated compound which freezes out at those temperatures. For example, $NH_4SCN \cdot NH_3$ freezes out at about $-20°$ to $-40°$ C., so that a cell designed to operate at this temperature should not have, as its entire electrolyte, a mixture of ammonium thiocyanate and ammonia in a 1:1 molar ratio.

Another factor to be taken into consideration in determining the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell and, in many cases, the anode potential is reduced. Similar consideration is applied to the cathode; however, the nature of the cathode material and/or type of solute will frequently result in different ranges of concentration requirements.

The above-mentioned considerations being borne in mind, the amount of solute actually employed may range up to the limits of its solubility in the liquid ammonia at the temperature under consideration. The amount may actually exceed the limits of its solubility in the liquid ammonia. Thus, aside from the questions of optimum conductivity, and of the freezing out of solvated compounds as discussed above, it is not material that excess solute be present.

In order to provide significant current capacity in the cell, it has been found necessary to provide a concentration of solute in the liquid ammonia of at least 1 mol percent. Particularly advantageous results are obtained when the concentration is at least about 2 mol percent. As to the upper concentration limits for the solute, it is obviously impossible to set a specific figure and say that the compositions on one side are all operable for any purpose and those on the other side are not, since much depends upon the particular solute selected, the nature of the anode and of the cathode, the operating characteristics desired, the temperature and pressure conditions under which the cell is to be operated, and the like, all of which factors must likewise be taken into consideration in conventional aqueous current-producing cell systems. However, as stated above, the amount of solute employed may even exceed its solubility in the ammonia.

The foregoing discussion has dealt with the solute broadly and no distinction has been made between the situation where the electrolyte to be formed is uniform throughout and the situation where the electrolyte is formed into two components—the anolyte and the catholyte—in which the anolyte and the catholyte differ as to composition. In certain instances it is desirable that the anolyte, that is the portion of the electrolyte adjacent the anode, and the catholyte, that is the portion of the elecrolyte adjacent the cathode, differ from each other as to composition. In such case the solute adjacent the cathode in the cathode section of the cell may differ from the solute adjacent the anode in the anode section of the cell. Where the anolyte and catholyte are to differ, the anode section and the cathode section of the cell compartment may be separated from each other by means of a porous or permeable diaphragm. Even in this case, of course, the anode and the cathode will be in ionic flow relationship. In any event, in accordance with the present invention, the defined sulfate will be present in the cathode section for contact with the cathode.

In one form of cell system in which the anolyte and catholyte differ, the anode comprises an electro-positive metal of the type discussed below, and the solute adjacent the anode comprises a metal salt the cation of which is a metal corresponding to the electro-positive metal of the anode or a metal higher in the electromotive series than the electro-positive metal of the anode, that is, a metal of at least the same level in the electromotive series as the electro-positive metal of the anode; and the solute adjacent the cathode comprises an ammonium salt and/or a metal salt.

Referring to the electrodes, the anode generally comprises an electro-positive metal. Any metal above ferrous iron in the electro-chemical series, particularly lithium sodium, potassium, casesium, rubidium, calcium, strontium, barium, magnesium, zinc, aluminum, beryllium, manganese, and the like, or mixtures thereof as well as alloys containing one or more of these metals, is suitable. Of the metals, the alkali and alkaline earth metals and zinc, especially lithium, calcium, magnesium, and zinc, particularly the first, are preferred.

The exact nature of the materials selected as anode will depend upon many factors, including the characteristics desired in the cell. The characteristics desired may dictate the type of electrolyte required, which, in turn, may determine which material should constitute the anode. For example, if high voltage is the criterion, a metal which is highly active, such as lithium, calcium, and other alkali and alkaline earth metals and alloys containing them, may be selected for the anode. If a moderate voltage is desired, less active of the alkaline earth metals, such as magnesium, and other metals such as aluminum, manganese, zinc, and alloys containing them, may be selected.

Reference has been made above to the use, as anode, of alloys containing one or more of the metals listed. The alloying of the anode metal with another metal reduces the availability of the anode metal, and, hence, its chemical activity. Thus, by appropriate selection of alloys containing highly active anode metals alloyed with less active metals, it is possible to employ as anode an alloy containing a highly active metal in situations where the use of that metal by itself would be impractical. Examples of such alloys are lithium aluminum alloys, lithium amalgams, lithium zinc alloys, lithium magnesium alloys, lithium lead alloys, and the like.

The cathode may be made up of a conductive material that is inert to the electrolyte such as lead, electrolytic carbon, platinum, boron, zirconium, tantalum, or the like. Of this group, lead and carbon are the preferred materials. However, in applications where carbon is mechanically unsuitable, a conducting protective film may be used to coat and protect a reactive metal cathode conductor.

The design or construction of the cell compartment, with which the present invention is not principally concerned, may vary widely depending upon the particular use intended for the cell. The cell may be constructed from a wide variety of relatively cheap and available materials, for example, iron, glass, ceramic material, rubber or synthetic rubber-like materials, synthetic resins, and the like. The material selected, of course, should be chemically resistant to liquid ammonia.

Likewise, the electrodes may be of any desired shape, such as flat sheets, rods, rolls, cylinders, bobbins, discs, or the like.

An important feature, as far as the present invention is concerned, is to provide, in contact with the cathode at least by the time the cell is to operate, a sulfate of a heavy metal below ferrous iron in the electrochemical series. Such compounds include the sulfates of lead, cadmium, nickel, tin, copper, mercury, silver, gold and ferric iron. These sulfates are insoluble in liquid ammonia, and accordingly, there is no danger of their migrating to the anode and interfering with the electrochemical reaction there. Of the stated sulfates, lead sulfate and copper sulfate are preferred with lead sulfate being particularly advantageous.

If it is desired to render the sulfate conductive, finely-divided conducting material, such as carbon, copper, and the like, may be mixed with it. Such conducting material should be substantially insoluble in liquid ammonia.

The essential current generating reaction of the present cell is

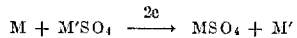

where M is the electropositive metal of the anode and M' is the cation of the solid sulfate. The current generating life of the cell is limited by the quantity of anode metal and sulfate available for reaction. Therefore, the amount of sulfate employed will be dictated largely by the size of the cell and its components and design considerations, all of which is well known to those skilled in the electric current-producing cell art where the same factors are encountered such as in "electrode-limited" cell systems.

Referring then to the drawings, FIGURES 1 and 2, as stated, illustrate schematically cell systems embodying the present invention. The cell of FIGURE 1 comprises a cylindrical non-conducting casing 1, a cathode 2 and an anode 3. Paper separators 4 are impregnated with a suitable electrolyte solute as described hereinabove. 5 represents a body comprising the stated sulfate in contact with cathode 2, and this body may consist of a mixture of finely-divided sulfate and finely-divided inert conducting material such as carbon (graphite). Cathode 2 and anode 3 are provided with suitable conducting wires 6 and 7, respectively. Ports 8 and 9 are provided in casing 1 through which ammonia is admitted, either in liquid form or as a vapor. Where the cell is to be activated through the admission of ammonia, the circuit is completed and ammonia in vapor form is injected through ports 8 and 9. The admitted ammonia condenses in contact with the sulfate body and with the electrolyte solute to dissolve the solute thus forming the complete electrolyte and activating the cell. On the other hand, before completing the circuit, the ammonia may be admitted to form the electrolyte, the cell requiring only the completion of the circuit to produce current.

FIGURE 2 illustrates a self-contained, ammonia-vapor-activated cell unit in which the ammonia is located in a compartment separated from the cell proper by a rupturable diaphragm. In this figure, 10 represents an outer cylindrical casing or container such as of steel. 11 represents a cylindrical cell casing which serves as the anode and hence is of an electropositive metal as described hereinabove. Cell casing 11 is provided with ports 12 for admission of ammonia vapor. Preferably, a plurality of rows of ports are provided, such as rows 120° apart about the periphery of cell casing 11. A paper cylinder 13, impregnated with electrolte solute salt is located inside and adjacent cell casing 11. The numerals 14 represent bodies of electrolyte solute shown here as centrally apertured paper discs impregnated with electrolyte solute. Upper solute body 14 is insulated from outer casing 10 as by layer 18 of synthetic resin or elastomer. 15 is a further paper disc impregnated with electrolyte solute but containing no central opening thus lying between cathode 16 and cell casing 11. The numerals 17 represent bodies of heavy metal sulfate preferably admixed with a finely-divided conductive material. In this connection an approximately three-to-one, by weight, mixture of finely-divided sulfate and finely-divided carbon is especially suitable. Suitable lead wires or connections 19 and 20, respectively, are attached to the anode and cathode, respectively. A quantity of anhydrous, liquid ammonia 21 is held in compartment 22 in the lower portion of outer casing 10, separated from the cell compartment by a frangible membrane or diaphragm 23 adapted to rupture at a rapid increase in pressure within compartment 22. Such a diaphragm should be inert towards liquid ammonia, such as thin, for example 4 mil, steel. Heating cartridge 24 is held within recess 25 formed in the lower end of outer casing 10 by a plug or solidified resin 26. Application of current through connections 27 and 28, initiates cartridge 24 thus generating heat. The heated ammonia tending to vaporize builds up pressure in compartment 22 until diaphragm 23 ruptures permitting ammonia vapor to flow between outer casing 10 and cell casing 11 and into the cell through ports 12. With the circuit completed through leads 19 and 20 the cell is activated generating current. The number of electrolyte layers and of sulfate layers is not critical and any convenient number may be employed.

FIGURE 3 illustrates a battery, that is, a plurality of individual cells, in which the cells are interconnected and within a common chamber. An outer, insulating, casing 30, is provided preferably of a synthetic resin. Each cell 31 is made up of the same components: 32 is the anode in the form of a thin disc; 33 is a body of electrolyte solute shown here as a paper disc impregnated with solute salt; 34 is a body of heavy metal sulfate, shown here as a disc made of finely-divided sulfate, finely-divided carbon and paper fibers, and 35 is the cathode in the form of thin disc. The cathode of each cell is electrically connected to the anode of the next, below, succeeding cell by means of a conductive pin or rivet 36 inserted through a hole in the anode and soldered to the cathode. The lowermost cathode is connected to a lead 38, and the uppermost anode is connected to a lead 39. Casing 30 is provided with ports 37 for the admission of ammonia, either as a liquid or gas, to the cell system. Activation of the battery is achieved, with the circuit being completed through leads 38 and 39, by the admission of ammonia into the cell system. Although the drawing shows five cells, it will be understood that any convenient number of cells may make up the battery.

In the embodiment wherein the cell is activated through the admission of ammonia vapor, it is preferred that the cell compartment, before the addition of the ammonia, be free of moisture, and, preferably, also substantially free of air. Hence, in preparation of the cell in accordance with this embodiment, the cell compartment may be evacuated or flushed with a dry inert gas which is soluble in the ammonia, prior to sealing.

The following examples illustrate the preparation and operation of the improved cell system of the present invention, but are not intended to limit the scope of the invention in any way:

*Example I*

In this example a cell similar in construction to that of the cell shown in FIGURE 2 of the drawings is employed. The cell casing is an 0.5 inch (O.D.) magnesium alloy tube about three inches long. The thickness of the tube wall is ³⁄₆₄ inch. The tube alloy is that designated by the ASM as AZ 31 B–O containing 3% aluminum, 1% zinc and the balance magnesium. The tube is provided with three rows of ³⁄₆₄ inch diameter holes located 120° apart about the periphery of the tube and the holes in each row being about ⅜ inch apart. Next to the inner surface of the tube is a cylinder formed of a piece of drop reaction filter paper impregnated with an aqueous solution of ammonium thiocyanate and dried. The paper represents 4.125 square inches and contains 1100 mg. of ammonium thiocyanate. There are used sixteen electrolyte solute discs 7/16 inch in diameter prepared from the ammonium thiocyanate-impregnated filter paper, each disc containing 40 mg. of ammonium thiocyanate. Between each disc is a layer composed of a mixture of three parts, by weight, of powdered lead sulfate and powdered graphite; total weight of this mixture in the cell being 6 grams. The cathode is a 1/8 inch lead row about 3 1/4 inches long inserted in the center of the tube. With appropriate lead wires attached to the anode casing and cathode and the circuit completed, the cell is activated by forcing about 12 grams of liquid ammonia at −40° F. through the ports using argon gas under 220 p.s.i. to provide the pressure.

The cell is held in a refrigerated ethyl alcohol bath at −40° F., and, at a 200 milliampere drain, the voltage characteristics are as follows:

| Time: | Voltage (volts) |
|---|---|
| 3 secs. | 1.70 |
| 1 min. | 1.72 |
| 5 min. | 1.70 |
| 10 min. | 1.70 |
| 15 min. | 1.70 |
| 20 min. | 1.67 |
| 30 min. | 1.60 |
| 40 min. | 1.56 |
| 45 min. | 1.50 |
| 50 min. | 1.45 |
| 60 min. | 1.32 |

Upon subsequent removal of the cell from the cold bath and permitting it to reach room temperature, the voltage characteristics, at 200 milliampere drain, are as follows:

| Time: | Voltage (volts) |
|---|---|
| 5 min. | 1.76 |
| 10 min. | 1.74 |
| 15 min. | 1.68 |
| 25 min. | 1.63 |
| 35 min. | 1.55 |
| 50 min. | 1.48 |
| 60 min. | 1.30 |
| 65 min. | 1.18 |

*Example II*

In this example a battery having a construction similar to that shown in FIGURE 3 is employed. Five cells, each 1/2 inch in diameter and about 0.1 inch thick, are prepared, each cell consisting of a thin disc of AZ 31 B-O magnesium to serve as anode; a disc of filter paper (about 40 mils thick) impregnated with 25 mg. of ammonium thiocyanate; a disc (about 25 mils thick) prepared by mixing 1 part, by weight, of powdered lead sulfate, 1 part of powdered graphite and 0.5 part of paper pulp fibers with water, filtering to lay down a sheet, lightly pressing and drying (approximately 35 mg. of lead sulfate per disc); and a disc cut from a lead sheet to serve as cathode. The cathode disc of one cell is connected to the anode disc of the adjacent cell by means of a small brass rivet inserted through a central aperture in the anode disc and soldered to the cathode disc. The five cells are so connected in series and the assembly is covered with polyvinyl chloride. Four 0.02 inch holes are provided in the plastic casing for admission of ammonia. After attaching leads to end anode and end cathode, the battery is placed in a vessel into which ammonia vapor is admitted under pressure thereby activating the cells. The battery is operated for thirty minutes at open circuit and then for one minute at 10 milliamperes. The output is 9.1 volts under open circuit conditions and 8.25 volts under the 10 ma. load.

The battery is then subjected to a vacuum (100 microns of mercury pressure) to remove the ammonia and thereby to deactivate the battery. The battery is again activated, but with liquid ammonia at 70° F. under 270 p.s.i. pressure argon. At a load of 10 milliamperes the voltage characterisics are as follows:

| Time, min. | Volts/cell | Total Voltage |
|---|---|---|
| 0 | 1.65 | 8.25 |
| 1 | 1.70 | 8.50 |
| 2 | 1.70 | 8.50 |
| 5 | 1.60 | 8.00 |
| 15 | 1.55 | 7.75 |
| 17 | 1.50 | 7.50 |
| 19 | 1.45 | 7.25 |
| 20 | 1.40 | 7.00 |
| 22 | 1.35 | 6.75 |
| 23 | 1.30 | 6.50 |

*Example III*

In this example a cell having a structure similar to that shown in FIGURE 1 is employed.

The cathode is a disc of lead 1/2 inch in diameter and 10 mils thick; the anode is a disc of AZ 31 B-O magnesium 1/2 inch in diameter and 16 mils thick; the depolarizer next to the cathode is made up of two discs (1/2 inch in diameter) each from a sheet prepared by mixing 2 parts, by weight, of powdered lead sulfate, 1 part of powdered graphite and 1 part of paper fibers with water, filtering to form a sheet, lightly pressing and drying (each disc contains about 20 mg. of lead sulfate); and the electrolyte solute body next to the anode is made up of two discs (1/2 inch in diameter) each from a sheet of filter paper impregnated with an aqueous solution of potassium thiocyanate (each disc contains about 30 mg. of potassium thiocyanate). The assembly is covered with a film of polyvinyl resin, openings being provided for the admission of ammonia, and electrical connections are made to the anode and cathode.

The cell is placed in a container into which anhydrous liquid ammonia is flowed, permeating and activating the cell. Placed on open circuit for 10 minutes at room temperature, the voltage reaches 1.88 volts. Then under a 10 milliampere load, the output of the cell is 27 coulombs over 45 minutes. The open circuit voltage at the end of this time is 1.6 volts.

*Example IV*

Example III is repeated using, however, lithium thiocyanate in place of potassium thiocyanate as the electrolyte solute, with comparable results.

*Example V*

Example III is repeated using, however, magnesium thiocyanate in place of the potassium thiocyanate as the electrolyte solute; copper sulfate in place of the lead sulfate as the depolarizer, and a carbon rod 1/2 inch in diameter as the cathode. The depolarizer body is prepared from a mixture of 100 mg. of copper sulfate and 100 mg. of graphite. The electrolyte solute body is composed of four discs each prepared from a sheet of filter paper impregnated with an aqueous solution of magnesium thiocyanate (each disc contains 24 mg. of magnesium thiocyanate).

The cell is activated by placing it in a container of vaporized anhydrous ammonia. Under open circuit conditions for 20 minutes the cell voltage reaches 2.06 volts. Then under a load of 12.5 milliamperes the cell produces an average of 1.55 volts over a period of 66 minutes, the voltage at the end of this time being 1.01 volts.

Modification is possible in the selection of anode, cathode and electrolyte solute components and combinations as well as in the particular heavy metal sulfate selected for such combinations without departing from the scope of the invention.

I claim:

1. In an ammonia electric current-producing cell system employing a metallic anode higher in the electrochemical series than ferrous iron, a cathode of a conductive material inert to the electrolyte, and electrolyte solute soluble in liquid ammonia and selected from the group consisting of ammonium salts and salts of metals at least as electropositive as said anode, the improvement wherein a sulfate of a heavy metal below ferrous iron in the electrochemical series is in contact with the cathode and serves as depolarizer.

2. The product of claim 1 wherein said sulfate is lead sulfate.

3. In an ammonia electric current-producing cell system employing a metalic anode higher in the electrochemical series than ferrous iron, a cathode of a conductive material inert to the electrolyte, and electrolyte solute soluble in liquid ammonia and selected from the group consisting of ammonium salts and salts of metals at least as electropositive as said anode, the improvement wherein a conductive mixture of a sulfate of a heavy metal below ferrous iron in the electrochemical series and of a finely-divided electrically conductive material is in contact with the cathode and serves as depolarizer.

4. An electric current-producing cell device having a metallic anode higher in the electrochemical series than ferrous iron and a cathode of a conductive material inert to the electrolyte; an anolyte solute soluble in liquid ammonia and selected from the group consisting of ammonium salts and salts of metals at least as electropositive as said anode, and a sulfate of a heavy metal below ferrous iron in the electrochemical series in contact with the cathode and serving as depolarizer.

5. The product of claim 4 wherein said sulfate is lead sulfate.

6. An electric current-producing cell having a metallic anode higher in the electrochemical series than ferrous iron, a cathode of a conductive material inert to the electrolyte, an electrolyte of liquid ammonia having material dissolved therein to render it electrically conductive and selected from the group consisting of ammonium salts and salts of metals at least as electro-positive as said anode, and a sulfate of a heavy metal below ferrous iron in the electrochemical series in contact with the cathode and serving as depolarizer.

7. An ammonia-activatable electric current-producing cell device having a cell compartment and, within said cell compartment, a metallic anode higher in the electrochemical series than ferrous iron, a cathode of a conductive material inert to the electrolyte, electrolyte solute soluble in liquid ammonia and selected from the group consisting of ammonium salt and salts of metals at least as electropositive as said anode, a sulfate of a heavy metal below ferrous iron in the electrochemical series in contact with said cathode and serving as depolarizer, and means for introducing ammonia to said cell compartment.

8. An ammonia-activatable electric current-producing cell device having a cell compartment and, within said cell compartment, a metallic anode higher in the electrochemical series than ferrous iron, a cathode of a conductive material inert to the electrolyte, electrolyte solute free of any electrolyte solvent and selected from the group consisting of ammonium salts and salts of metals at least as electropositive as the metal of said anode, a sulfate of a heavy metal below ferrous iron in the electrochemical series in contact with said cathode and serving as depolarizer, and means for introducing ammonia in the vapor state to said cell compartment.

9. An ammonia-activatable electric current-producing cell device having a cell compartment and, within said cell compartment, a metallic anode higher in the electrochemical series than ferrous iron, a cathode of a conductive material inert to the electrolyte, and a conductive mixture of a sulfate of a heavy metal below ferrous iron in the electrochemical series and of finely-divided electrically conductive material in contact with said cathode and serving as depolarizer, and means for introducing ammonia to said cell compartment.

10. The device of claim 9 wherein said finely-divided conductive material mixed with said sulfate is carbon.

11. The method of generating electric current which comprises contacting a metallic anode higher in the electrochemical series than ferrous iron and a cathode of a conductive material inert to the electrolyte with an electrolyte having liquid ammonia as the solvent, there being a sulfate of a heavy metal below ferrous iron in the electrochemical series in contact with said cathode and serving as depolarizer, and completing the circuit between the anode and cathode.

12. The method of generating electric current which comprises contacting a metallic anode higher in the electrochemical series than ferrous iron and a cathode of a conductive material inert to the electrolyte with an electrolyte having salt dissolved in liquid ammonia the cation of which is selected from the group consisting of ammonium and electropositive metals at least as electropositive as said anode, there being a sulfate of a heavy meal below ferrous iron in the electrochemical series in contact with said cathode and serving as depolarizer; and completing the circuit between the anode and cathode.

13. The method of generating electric current which comprises contacting a metallic anode higher in the electrochemical series than ferrous iron and a cathode of a conductive material inert to the electrolyte with an electrolyte of liquid ammonia having material dissolved and ionized therein to render it electrically conductive and selected from the group consisting of ammonium salts and salts of metals at least as electropositive as said anode, there being a sulfate of a heavy metal below ferrous iron in the electrochemical series in contact with said cathode and serving as depolarizer, and completing the circuit with an external load between the anode and cathode.

14. The method of generating electric current which comprises introducing ammonia to a cell compartment having a metallic anode higher in the electrochemical series than ferrous iron, a cathode of a conductive material inert to the electrolyte, electrolyte solute free of any electrolyte solvent and selected from the group consisting of ammonium salts and salts of metals at least as electropositive as said anode, and a sulfate of a heavy metal below ferrous iron in the electrochemical series in contact with said cathode and serving as depolarizer, the circuit with an external load between the anode and cathode being completed.

15. The method of claim 14 wherein there is also present in said cell compartment at least adjacent the anode an ammonium salt soluble in liquid ammonia.

16. An ammonia-activatable electric current-producing battery device having a plurality of electrically connected cells within a common compartment, each cell having a metallic anode higher in the electrochemical series than ferrous iron, a cathode of a conductive material inert to the electrolyte, electrolyte solute soluble in liquid ammonia and selected from the group consisting of ammonium salts and salts of metals at least as electropositive as said anode, and a sulfate of a heavy metal below ferrous iron in the electrochemical series in contact with said cathode and serving as depolarizer.

References Cited in the file of this patent
UNITED STATES PATENTS

| | | |
|---|---|---|
| 552,211 | Thurnauer | Dec. 31, 1895 |
| 2,670,395 | Audubert et al. | Feb. 23, 1954 |
| 2,937,219 | Minnick et al. | May 7, 1960 |

UNITED STATES PATENT OFFICE
CERTIFICATE OF CORRECTION

Patent No. 3,083,252                       March 26, 1963

William F. Meyers

It is hereby certified that error appears in the above numbered patent requiring correction and that the said Letters Patent should read as corrected below.

Column 2, line 72, for "of" read -- or --; column 5, line 2, for "an", first occurrance, read -- at --; line 42, after "amount" insert -- of solute --; column 9, line 10, for "row" read -- rod --; column 12, line 23, for "meal" read -- metal --.

Signed and sealed this 5th day of November 1963.

(SEAL)
Attest:

ERNEST W. SWIDER
Attesting Officer

EDWIN L. REYNOLDS
Acting Commissioner of Patents